Feb. 26, 1952 J. L. HAYNES 2,587,315
RAILROAD CAR TRUCK
Filed March 15, 1945 3 Sheets-Sheet 1
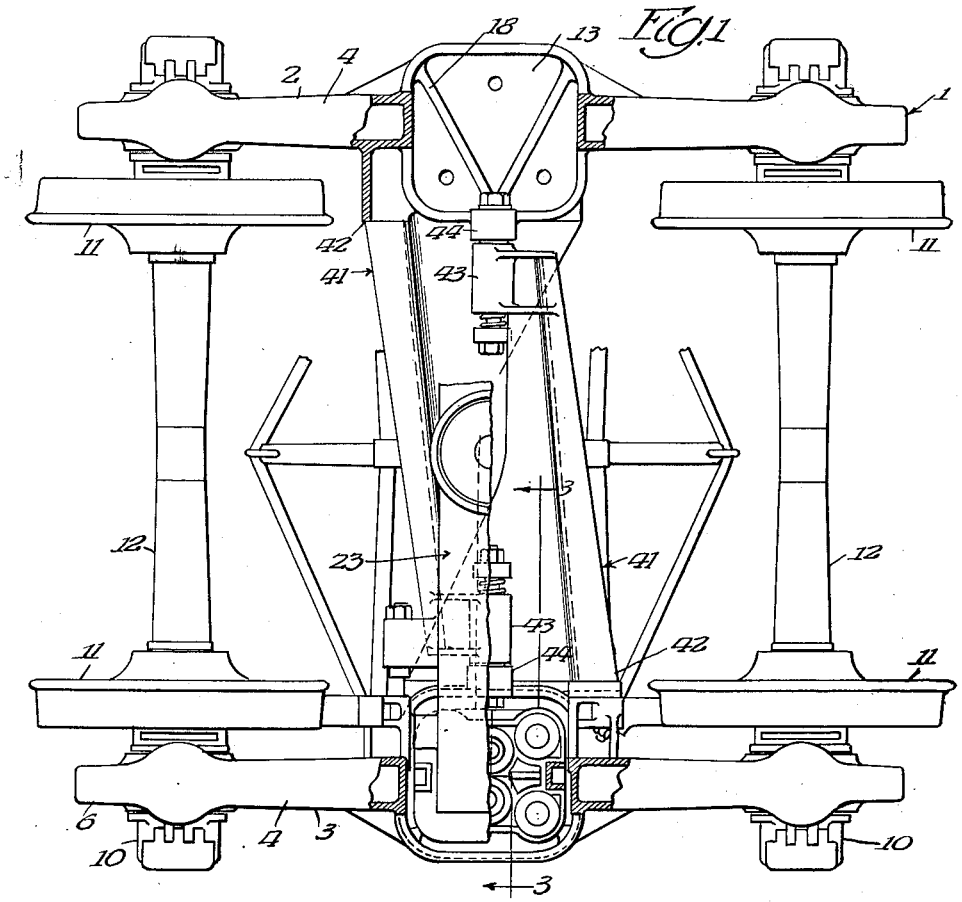
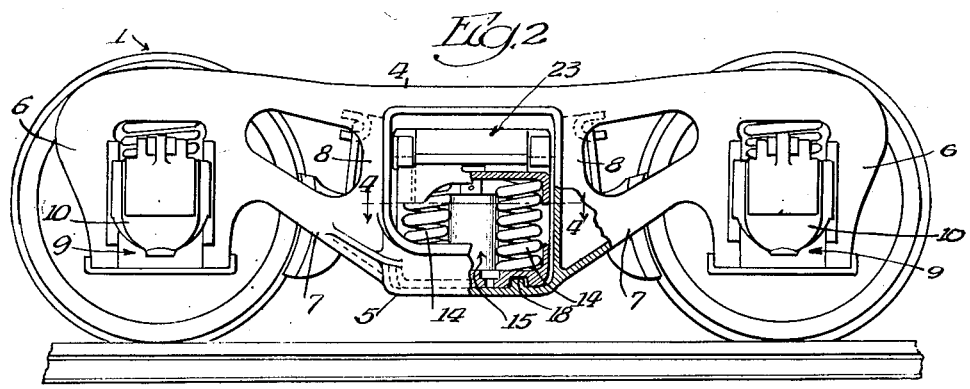
Inventor:
James L. Haynes,
By Spencer, Margall, Johnston & Cook,
Attys.

Feb. 26, 1952   J. L. HAYNES   2,587,315
RAILROAD CAR TRUCK
Filed March 15, 1945   3 Sheets-Sheet 2
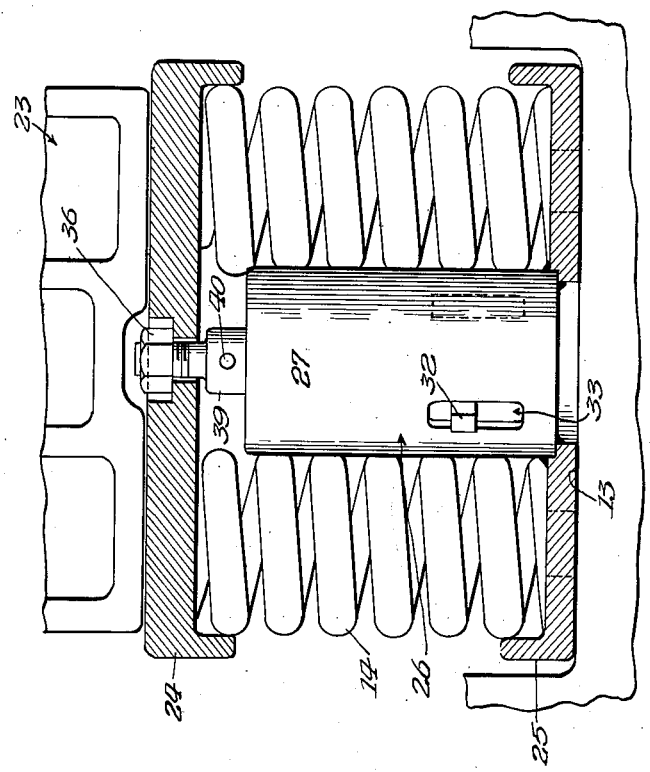
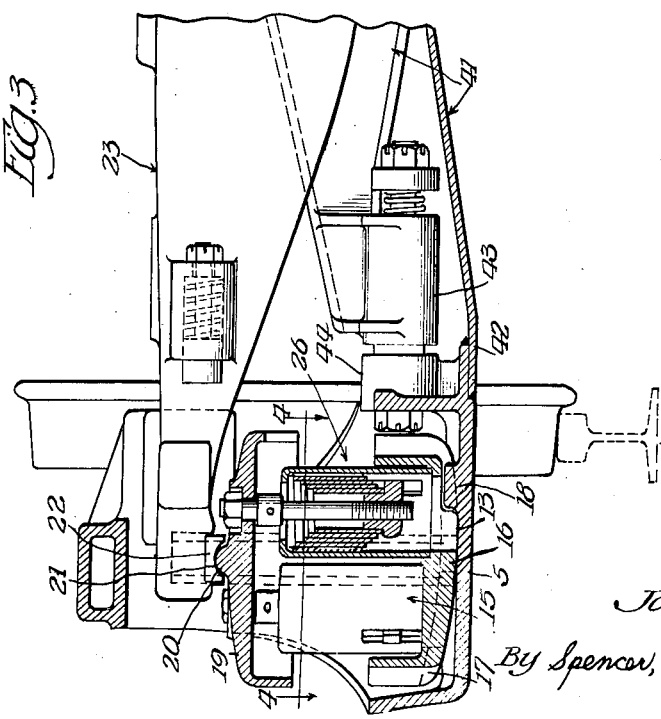
Inventor,
James L. Haynes,
By Spencer, Marzall, Johnston & Cook
Attys.

Feb. 26, 1952 J. L. HAYNES 2,587,315
RAILROAD CAR TRUCK
Filed March 15, 1945 3 Sheets-Sheet 3
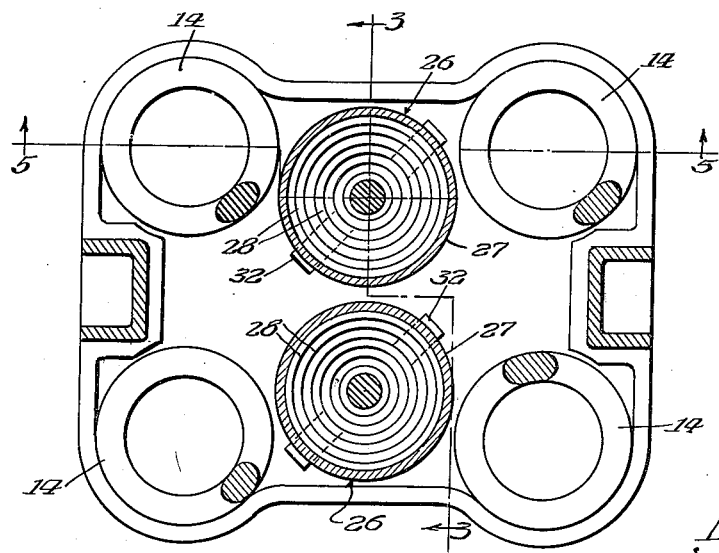
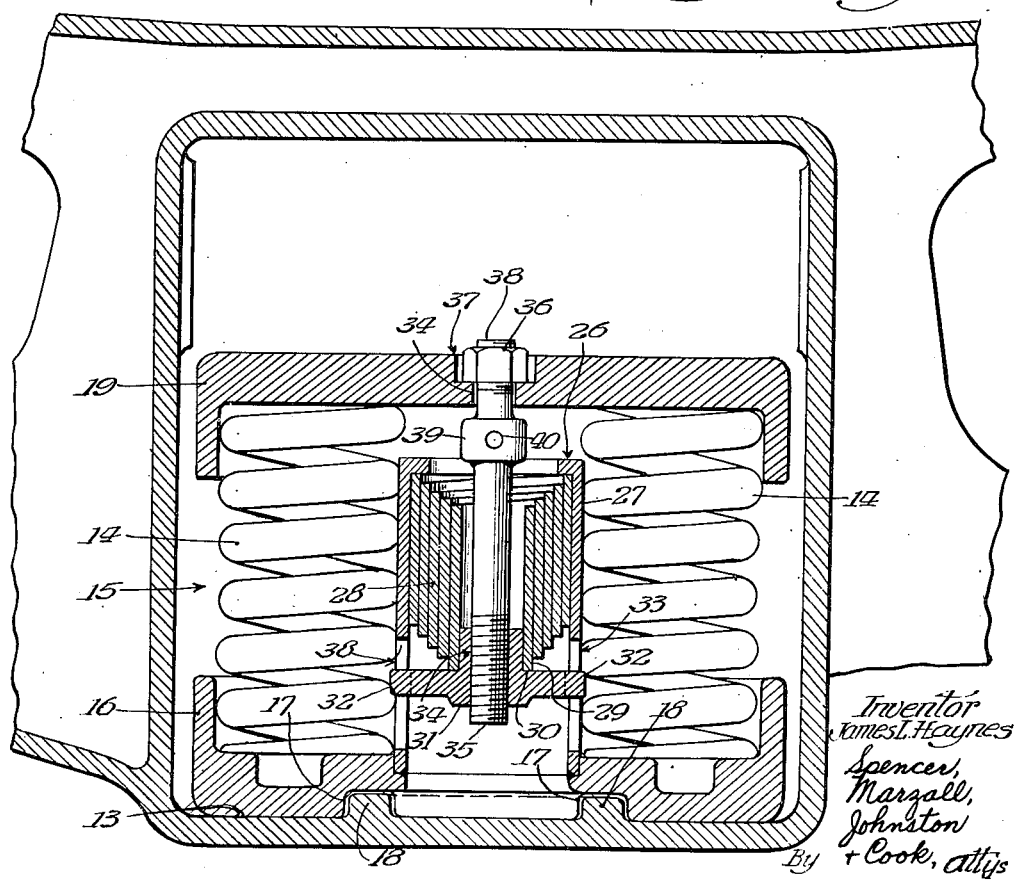

Patented Feb. 26, 1952

2,587,315

UNITED STATES PATENT OFFICE 2,587,315

RAILROAD CAR TRUCK

James L. Haynes, Glen Ellyn, Ill.

Application March 15, 1945, Serial No. 582,846

2 Claims. (Cl. 105—197)

This invention relates to railroad car trucks in general and particularly though not exclusively to freight car trucks.

Passenger car trucks are generally provided with multiple sets of springs to provide the necessary cushioning effect during travel and to overcome sudden vertical jars. Moreover, the load in passenger cars is relatively light and, therefore, there is very little difference in the spring deflection between an unloaded and a loaded passenger car. Freight cars, however, have a considerable differentiation between the loaded and the unloaded condition inasmuch as a normal so-called 50 ton freight car unloaded would weigh about 60,000 pounds while loaded it would weigh about 160,000 pounds. This differentiation in load causes a considerable deflection in the springs of the trucks. The standards required by certain A. A. R. interchange rules provide that the horizontal center line of the coupling should not vary vertically more than 3 inches whereby it is necessary for the couplings to interlock with loaded and unloaded cars and still maintain the proper bearing surface between the couplings. The present spring suspension on freight cars does not provide for the proper riding qualities at high speeds and, therefore, the lading is subject to considerable jarring and perhaps shifting. It is, therefore, desirable that the riding qualities of freight cars be enhanced considerably not only for the purpose of preventing rapid deterioration to the cars and trucks themselves, because of the jars which the cars are subjected to during normal service but also to prevent damage to the lading, particularly at high speeds. Substitution of passenger car trucks of the conventional high speed type for freight car service is not only impossible, in that it will prevent the proper maintenance of standards with respect to the couplings caused by different truck heights, but it is also impractical because passenger car trucks are exceedingly expensive as compared with freight car trucks. It is desirable that freight car trucks be made as smooth riding as possible and at the same time retain the present accessories to freight car trucks and maintain the conventional sizes, limits, etc. on freight car trucks as presently employed. It is, therefore, the primary object of the present invention to provide a freight car truck with new and novel means, whereby to maintain the present standards with respect to limiting dimensions, brake rigging and other accessories, without changing the overall sizes and limits as well as to make a car applicable for light and heavy loads and still maintain proper easy riding.

Another important object of the invention is to provide a freight car truck with new and improved spring means whereby the vertical oscillation of the load springs will be snubbed or cushioned, in effect similar to the function provided by shock absorbers or snubbers on automobiles.

A further object of the invention resides in the provision of means for effecting spring action in opposite directions whereby the deflection of the spring in one direction will be counteracted by the spring action of another spring so as to snub or dampen the rebound when the car is traveling over rough tracks or road beds.

Still another object of the invention consists in providing a railroad car truck having a plurality of operatively supporting helical springs of the conventional type in cooperation with an involute spring which is adapted to be preloaded so as to cause a certain amount of deflection of the helical springs whereby the deflection of the springs under load and during travel will be snubbed or dampened by the involute spring.

Still another object of the invention is to provide a freight car truck having a plurality of helical springs on which the weight applied to the bolster is carried, the springs being preloaded by additional spring means acting in compression and to compress to a predetermined extent the conventional helical springs.

Still another object of the invention is the provision of new and improved means of railroad car trucks to provide a resilient compression against the springs whereby the springs are preloaded by resilient compression.

A still further object of the invention is to provide a freight car truck having side frames and bolster extending therebetween wherein rocking elements for the boster have contacting surfaces with the side frames formed on a special curve whereby the bolster, being centered by the force of gravity, will operate to produce a horizontal inwardly acting transverse force at each rocking element.

Numerous other objects and advantages will be apparent throughout the progress of the specification.

The accompanying drawings illustrate certain selected embodiments of the invention and the views therein are as follows:

Fig. 1 is a detail plan section showing one form of a railroad car truck and embodying the invention, certain parts being broken away for the sake of clearness;

Fig. 2 is a detail side elevational view of the truck shown in Fig. 1 with certain parts broken away for the sake of clearness;

Fig. 3 is a detail vertical sectional view on the line 3—3 of Figs. 1 and 4, certain parts being omitted for the sake of clearness;

Fig. 4 is a detail plan section on the line 4—4 of Figs. 2 and 3;

Fig. 5 is a detail vertical sectional view on the line 5—5 of Fig. 4 but showing the helical springs in relief; and Fig. 6 is a detail vertical sectional view with springs in relief showing a similar spring arrangement to that used in Fig. 5 but to be applied without the use of a lateral rocking or swing motion design.

The particular railroad car truck construction herein shown for the purpose of illustrating the invention comprises a car truck 1 having oppositely disposed side frames 2 and 3. The side frames 2 and 3 each comprises a longitudinally forward to rearwardly extending top member 4, a bottom member 5, and pedestals 6, 6. The pedestals 6, 6 are operatively connected together by means of the top member 4 and by integral converging inclined members 7, 7. Integral vertical connecting members 8, 8 connect the converging parts 7 and the upper member 4. The pedestals 6, 6 are each provided with a pedestal opening 9 which receive the spring loaded journal boxes 10 protruding outwardly from the wheels 11 which are rigidly mounted on axles 12. The part 5 of each of the frames comprises a platform 13 upon which springs 14 of the conventional helical type are supported. The springs 14 may be mounted upon the platform 13 in the usual conventional manner and they may be mounted on a rocker element 15 of the type disclosed in applicant's copending application Serial Number 582,845, filed concurrently herewith now U. S. Patent No. 2,527,008, dated October 24, 1950.

The rocker element 15 may comprise a lower rocker member 16 which is mounted on top of the platform 13. The lower surface of the member 16 may be provided with a recess or groove formation 17 to receive a rib formation 18 on the upper side of the platform 13 whereby the rocker may have free arcuate or cam-like movement with respect to its base or support 13, the parts always being maintained in proper relative position by engagement between the rib portion 18 with the groove portion 17. The rocker element 15 also includes an upper member 19 which is provided with a longitudinally extending rib-like extension 20 operatively engaging a groove 21 formed on the underside of a projecting element 22 secured to the underside of the bolster means 23.

The bolster means 23 is used in both the generic and the specific sense in that it includes the bolster per se and all the connections or parts thereof which may be interposed between the bolster itself and the springs, such as a spring plate, or the member 19. The bolster means 23 may be directly supported on the springs, or it may be remotely supported on the springs, such as by interposing a spring plate, the means 19, or any additional members interposed whereby the load carried by the bolster will be eventually transmitted to the springs.

The springs 14 may be arranged between the members 16 and 19 as clearly shown in Fig. 5. They may rest upon the bottom platform 13, being mounted between plate members 24 and 25 and directly receiving the bolster 23, as clearly shown in Fig. 6. The springs 14 may be relatively long but of the general type referred to in a 50 ton freight car as the class D type of spring for a 5 and ½ inch by 10 inch truck for a car of 50 ton capacity. However, the springs 14 used alone would provide for too much vertical movement when operated at high speeds or under widely varying loads. It is desirable, therefore, that a relatively long spring be used but that the spring be partly compressed or preloaded and also that there be resilient means operating to produce a counteraction so as to effect a preload on the springs when gravity load imposed by the car weight, etc. is minimum.

The means for preloading the springs 14 may comprise involute spring members 26, 26 which are arranged within the spring assembly units as clearly shown in Figs. 4, 5 and 6. The involute spring construction 26 may comprise a cylinder 27 securely attached to lower member 16 or 25, in which there is mounted a spirally coiled spring 28, the various coils of the spring 28 extending out somewhat in conical or stepped fashion as indicated at 29 in Fig. 5. The innermost coil 30 of the spring 28 of the member 26 contacts with an adjusting member 31 mounted within the cylinder 27, there being wings or protuberances 32 on the member 31, which wings extend through cut outs 33 provided in the cylinder wall to keep the member 31 from turning relative to the cylinder 27 when the spring 28 is being compressed by tightening. The member 31 may be provided with a threaded sleeve portion 34 to threadedly receive the end of a longitudinally extending bar 35.

The bar 35 is concentrically positioned with respect to the spring 28 and extends upwardly through either the plate 19, Fig. 5, or the plate 24, Fig. 6, whichever construction is employed. The upper end of the rod or bar 35 has fixed thereto a head 36 so that the bar 35 may be rotated in a cooperating recess 37 formed in the member 19, Fig. 5, or the top plate 24, Fig. 6. It is desirable that the head 36 be fixed to the bar 35 and this construction may be accomplished by having the upper end of the bar 35 threaded with the head member 36 threadedly connected thereto and then secured in rigid position by peaning over the top of the bar 35 as indicated at 38 whereby there will be no relative rotation between the rod 35 and the head 36 but, instead, the member 36 will rotate along with the bar 35 when the bar is rotated. A protuberance 39 may be formed on the rod or bar 35 as shown so that a tool may be inserted in the hole 40 in the protuberance 39 to effect rotative adjustment of the rod 35 so as to preload the spring 28. The rotation of the rod 35 will cause the adjusting member 31 to be raised when the rod is rotated in a predetermined direction so as to preload the spring 28. The preloading of the spring 28 causes the top member 19 or 24 to be drawn toward the member 16 or 25, respectively, thereby also preloading the springs 14.

The construction indicated, and as more clearly shown in Fig. 4, comprises four helical springs 14 and two involute springs 28. The preloading of the springs 14 and spring members 26 is for the purpose of providing an initial load on the springs 14 which will correspond with the pressure that would be exerted by a fraction of the full load capacity of the car. When load is added to the car so as to produce added pressure on the springs 14, further deflection or compression will shorten the distance between the upper and lower ends of the springs 14, thereby allowing the springs 28 to lengthen which will cause them to exert a diminished downward force upon the members 19 and 24. In this way, when the car is fully loaded, the total deflection of springs 14 will have reached a point so that no appreciable extra load is imposed by spring members 26 because they will have been expanded to their free length. The resulting operation of this spring arrangement will be such that when a lightly loaded or empty car traveling at high speed encounters a rough section of track, the tendency for the springs to deflect and then rebound excessively is snubbed or retarded by the action of the springs 26 since the rebound or vertical upward movement resulting from a shock load from rough track tends to apply extra deflection to springs 26 thereby increasing the downward force which they exert upon springs 14 so as to prevent the tendency for springs 14 to expand excessively and to accentuate the vertical movement of the mass of the car, bolsters, etc. which are carried upon the springs.

The normal function of the springs 14 is for the purpose of cushioning the load to make soft riding, and, therefore, they are normally compressed except when on the rebound. The springs 26, however, are adapted to exert an outward force and, inasmuch as the coils of the involute spring members 28 are frictionally held together throughout their entire contacting length with respect to the adjacent coiled parts of the spring, a considerable friction is created. Thus, during the rebound of the springs 14, there will occur a frictional drag or snubbing or shock-absorbing effect to be had by the springs 26 to snub or cushion the rebound. A similar situation is present even though the car is fully loaded. However, the springs 14 will be more greatly compressed and by this compression the involute springs will tend to expand, thereby tending to remove the preload from springs 14 when the car is at rest. When the fully loaded car operates over irregular track at sufficiently high speed to tend to produce severe vertical shocks, the said shocks tend to produce corresponding recoil which will be dampened by the snubbing effect because of the internal friction of the coils 28 which absorb some of the kinetic energy from the vertically oscillating masses and thus will have the beneficial effect of dampening the vibration and amplitude of movement of springs 14, thereby producing less jarring effect upon the lading in the car as well as the mechanical parts of the truck and car itself.

The size and number of springs 14 and 26 and the preloading of the springs can be varied to suit conditions, depending on the car size, weight and load, and it may be necessary to increase or decrease the number of springs or to substitute additional springs 26 in relation to the load springs 14. Springs of different capacity may also be employed and the preloading is also adapted to be varied to suit the purposes intended so as to provide the proper preload and obtain the desired snubbing or shock-absorbing effect. Also, other springs, such as coil springs, may be substituted for the involute springs with means being provided for effecting the preloaded condition described with respect to the springs 14 and 26.

The contacting surfaces of the rocking elements with the side frames are formed on a special curve, and the bolster, being centered by the force of gravity, operates to produce a horizontal inwardly acting transverse force at each rocking element.

If desired, the truck herein described may be provided with means for maintaining the side frames in proper parallelism by employing the means disclosed and claimed in applicant's copending application Serial Number 577,191, filed February 10, 1945, now U. S. Patent No. 2,477,517, dated July 26, 1949. The said means for maintaining the frames 2 and 3 in proper parellelism comprises a pair of oppositely disposed members 41, 41. One end of a member 41 is rigidly secured by welding or otherwise to a side frame as indicated at 42. The other end may be provided with a cylindrical bearing 43 which engages an extending sleeve supported in a boss or other suitable member 44 rigidly or integrally secured to the opposite frame.

The invention provides new and improved means for effecting a snubbing action during rebound caused by the deflection of the springs while the car is traveling over rough rails. The car truck, which is the subject matter of this invention, is adapted to be limited to standard conventional overall sizes and limits and employs the usual conventional accessories such as brake rigging and the like.

The spring means is adapted to effect smooth and easy riding of the car and thereby protect the lading as well as to overcome excess deterioration of the car in use. The use of helical load springs in addition to resilient means for preloading the springs overcomes deficiencies inherent in conventional freight car truck construction and the resilient means may comprise involute spring structures as defined for causing the preloading of the helical springs. The invention is also applicable for use in connection with trucks embodying the rocker construction as disclosed in the aforesaid copending application, Serial No. 582,845, now U. S. Patent No. 2,527,008, dated October 24, 1950. Also, the invention of the present application is applicable to means for maintaining the opposite truck frames in proper parallelism by the use of the construction disclosed in the aforesaid copending application, Serial No. 577,191, now U. S. Patent No. 2,477,517, dated July 26, 1949. The preloading spring arrangement is adaptable to be used either alone or in combination with either or both of the aforesaid inventions described in the aforesaid applications.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. In a freight car truck embodying spaced side frames and a bolster, rocking elements carried by the side frames for supporting the bolster, said elements comprising vertically spaced opposed members, a plurality of helical springs disposed between said members, an involute spring disposed between said members, means connected to the lower one of said vertically spaced members to prevent upward movement of the upper end of said involute spring, a vertically movable support for said involute spring at the lower end thereof, movable connecting means between said support and the upper one of said vertically spaced members, said connecting means being movable to simultaneously raise said support for placing said involute spring under compression and to lower the upper one of said vertically spaced members for placing said helical springs under compression, said involute spring comprising a spiral coil having contacting surfaces thereby creating a friction between those contacting surfaces, whereby the involute spring will snub excess vertical spring action of said helical springs and will retard upward movement of the upper one of said vertically spaced members, the contacting surfaces of the rocking elements with the side frames being curved, and the said bolster being centered by the force of gravity, operating to produce a horizontal inwardly acting transverse force at each rocking element.

2. In a freight car truck embodying spaced side frames and a bolster, rocking elements carried by the side frames for supporting the bolster, said elements comprising vertically spaced opposed members, a plurality of helical springs disposed between said members, an involute spring between said members, means connected to the lower one of said vertically spaced members to prevent upward movement of the upper end of said involute spring, a vertically movable support for said involute spring at the lower end thereof, a vertical rod located within said involute spring, the lower end of said rod threadedly engaging a threaded opening in said support and the upper end of said rod passing through an opening in the upper one of said vertically spaced members, means on the upper end of said rod adapted to bear downwardly on the upper one of said vertically spaced members, whereby rotation of said rod in one direction will raise said movable support to place said involute spring under compression and will lower the upper one of said spaced members to place said helical springs under compression, said involute spring embodying a spiral coil having contacting surfaces thereby creating a friction between said such contacting surfaces, whereby the involute spring will snub excess vertical spring action of the helical springs and will retard upward movement of the upper one of said vertically spaced members, said rod being adjustable for increasing or decreasing the compression of the involute spring, the contacting surfaces of the rocking elements with the side frames being curved, and the said bolster being centered by the force of gravity, operating to produce a horizontal inwardly acting transverse force at each rocking element.

JAMES L. HAYNES.

REFERENCES CITED

The following references are of record in the file of this patent:

UNITED STATES PATENTS

| Number | Name | Date |
|---|---|---|
| 450,627 | Krehbiel | Apr. 21, 1891 |
| 466,349 | Hubbard | Jan. 5, 1892 |
| 594,559 | Richards | Nov. 30, 1897 |
| 825,255 | Whitman | July 3, 1906 |
| 932,489 | Murrey | Aug. 31, 1909 |
| 1,905,252 | Symington | Apr. 25, 1933 |
| 1,976,937 | Haseltine | Oct. 16, 1934 |
| 2,015,025 | Barrows | Sept. 17, 1935 |
| 2,079,985 | Busch | May 11, 1937 |
| 2,105,651 | Holland | Jan. 18, 1938 |

FOREIGN PATENTS

| Number | Country | Date |
|---|---|---|
| 163,007 | Great Britain | Feb. 9, 1922 |